United States Patent [19]

Boriani et al.

[11] Patent Number: 5,467,579
[45] Date of Patent: Nov. 21, 1995

[54] METHOD AND DEVICE FOR LATERALLY JOINING PRODUCT WRAPPINGS

[75] Inventors: Silvano Boriani; Antonio Gamberini, both of Bologna, Italy

[73] Assignee: G.D Societa' Per Azioni, Bologna, Italy

[21] Appl. No.: 262,395

[22] Filed: Jun. 20, 1994

Related U.S. Application Data

[63] Continuation of Ser. No. 900,951, Jun. 18, 1992.

[30] Foreign Application Priority Data

Jun. 21, 1991 [IT] Italy ................................. BO91A0222

[51] Int. Cl.⁶ ................................................ B65B 51/10
[52] U.S. Cl. ............................. 53/477; 53/463; 53/225; 53/234; 53/375.9; 53/376.2; 53/387.3
[58] Field of Search .......................... 53/232, 233, 234, 53/463, 466, 477, 579, 375.9, 375.8, 376.2, 387.3, 387.4, 224, 225, 228, 229, 547; 156/166, 167, 308.4

[56] References Cited

U.S. PATENT DOCUMENTS

| | | | |
|---|---|---|---|
| 2,037,631 | 4/1936 | Hultin | 53/463 X |
| 2,887,836 | 5/1959 | Minich | 53/234 X |
| 2,946,168 | 7/1960 | Manwaring et al. | 53/375.9 X |
| 3,064,403 | 11/1962 | Tokos et al. | 53/375.9 X |
| 3,200,555 | 8/1965 | Liedtke | 53/387.3 X |
| 4,144,695 | 3/1979 | Seragnoli | 53/234 |
| 4,208,854 | 6/1980 | Seragnoli | 53/234 X |
| 4,408,439 | 10/1983 | Anderson | 53/234 X |
| 4,790,115 | 12/1988 | Focke | 53/234 |
| 4,843,800 | 7/1989 | Focke . | |
| 4,845,924 | 7/1989 | Focke et al. | 53/234 X |
| 4,887,408 | 12/1989 | Mattei et al. | 53/463 X |

FOREIGN PATENT DOCUMENTS 2121754  5/1983  United Kingdom .

*Primary Examiner*—John Sipos
*Assistant Examiner*—Daniel Moon
*Attorney, Agent, or Firm*—Klauber & Jackson

[57] ABSTRACT

A method and device for laterally joining product wrappings, whereby the connection of two overlapping longitudinal portions of a tubular wrapping defined by a sheet of wrapping material wrapped about the product inside a wrapping seat is at least completed as the wrapped product is unloaded from the wrapping seat by a heated counterpusher.

7 Claims, 1 Drawing Sheet

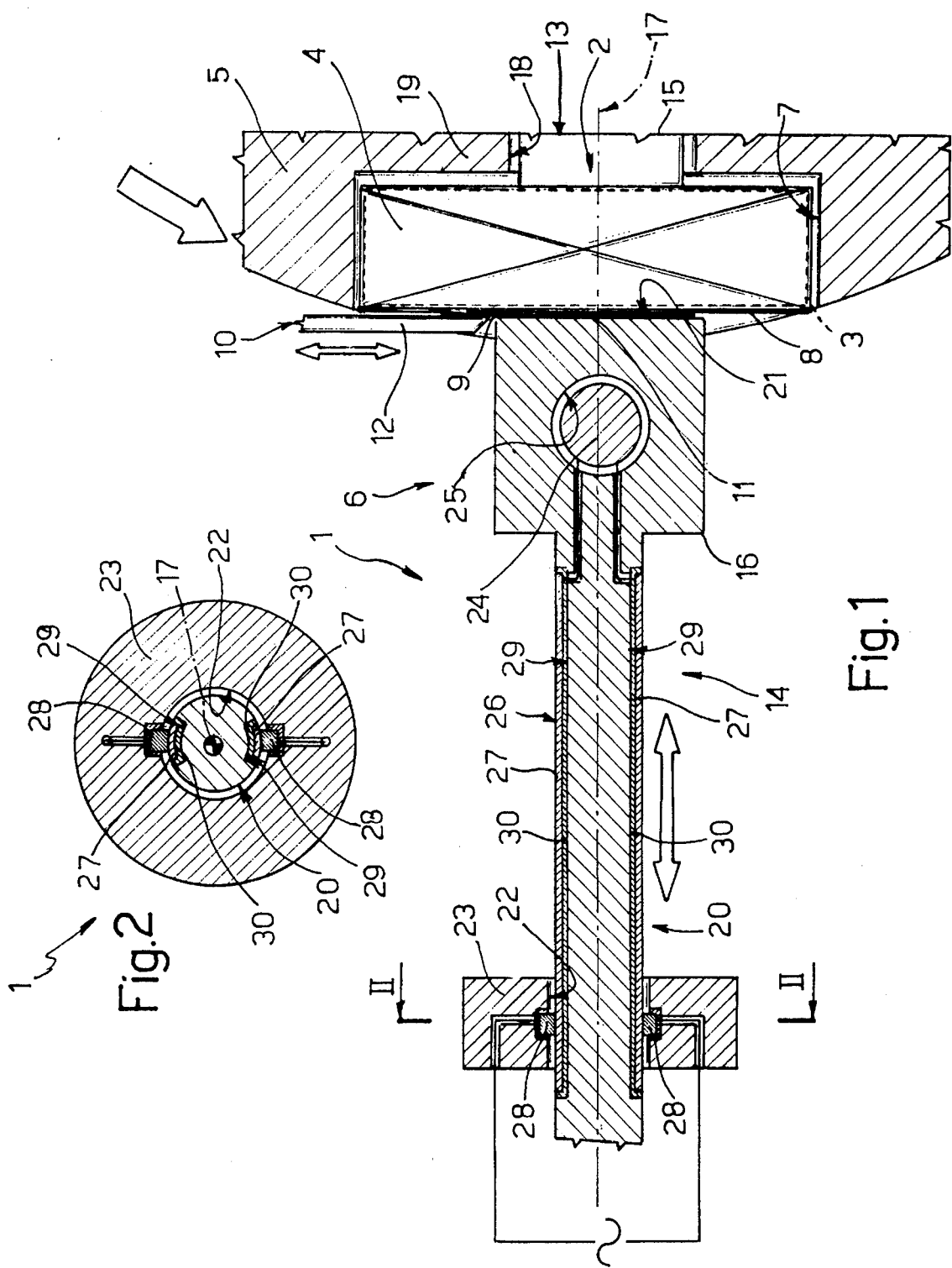

METHOD AND DEVICE FOR LATERALLY JOINING PRODUCT WRAPPINGS

This application is a continuation of application Ser. No. 07/900,951, filed Jun. 18, 1992.

BACKGROUND OF THE INVENTION

The present invention relates to a method of laterally joining product wrappings.

The present invention is particularly suitable for wrapping substantially parallelepiped products, such as single or groups of cigarette packets to which the following description refers purely by way of example.

Such products are normally wrapped by first forming a tubular wrapping about the product, usually by means of a wrapping device comprising a wrapping wheel with a number of peripheral radial seats, each designed to receive a sheet of wrapping material and a respective product at a loading station.

As the sheet is fed inside the seat, it is folded in a U about the product so as to present two projecting longitudinal portions, which are folded one on top of the other to define an overlapping lateral portion, and then connected to define said tubular wrapping.

Each product complete with the tubular wrapping is then unloaded off the wrapping wheel at an unloading station by means of a transfer device normally comprising a gripping and/or control element for engaging the overlapping lateral portion of the wrapping.

The two overlapping sheet portions are normally gummed together or heat-sealed in the case of heat-sealable wrapping material.

The above known wrapping method presents several drawbacks due to the manner in which the two overlapping sheet portions are joined.

In the case of a gummed joint, the wrapped products may, under certain operating conditions, reach the unloading station before the gum is dry, thus resulting in the wrapping coming unstuck and the product automatically being rejected.

In the case of heat-sealing, on the other hand, the design of the wrapping device as described above is enormously complicated by the presence of heat-sealing devices on the wrapping wheel or along the path of the products between the loading and unloading stations.

SUMMARY OF THE INVENTION

It is an object of the present invention to provide a method of laterally joining product wrappings, designed to overcome the aforementioned drawbacks.

According to the present invention, there is provided a method of laterally joining product wrappings, each said wrapping being a tubular wrapping defined by a sheet of wrapping material wrapped about a respective said product as this is fed forward on a wrapping conveyor, each tubular wrapping comprising an overlapping lateral portion along which two opposite longitudinal portions of said sheet are arranged one on top of the other; said method providing for stable connection of said two overlapping portions of said sheet, and being characterized by the fact that at least the terminal portion of said stable connection is effected as the product and respective wrapping are unloaded off the wrapping conveyor.

According to a preferred embodiment of the above method, formation of said stable connection comprises a stage consisting in transmitting heat to said overlapping lateral portion during said unloading stage.

More specifically, heat is preferably transmitted to said overlapping lateral portion via contact between the overlapping lateral portion and a heated unloading means whereby the product and respective wrapping are unloaded off the wrapping conveyor.

The present invention also relates to a device for laterally joining product wrappings.

According to the present invention, there is provided a device for laterally joining product wrappings, each said wrapping being a tubular wrapping defined by a sheet of wrapping material wrapped about a respective said product as this is fed forward on a wrapping conveyor, each tubular wrapping comprising an overlapping lateral portion along which two opposite longitudinal portions of said sheet are arranged one on top of the other; said device being characterized by the fact that it comprises means for successively unloading said products and respective wrappings off said conveyor; said unloading means comprising joining means cooperating with each said product at said overlapping lateral portion, as said product and respective said tubular wrapping are unloaded off said wrapping conveyor, so as to effect a stable connection of at least the terminal portion of said two overlapping sheet portions.

According to a preferred embodiment of the above device, said joining means comprise a heat source on said unloading means.

BRIEF DESCRIPTION OF THE DRAWINGS

A non-limiting embodiment of the present invention will be described by way of example with reference to the accompanying drawings, in which:

FIG. 1 shows a section and partial block diagram of a preferred embodiment of the device according to the present invention;

FIG. 2 shows a section along line II—II in FIG. 1.

DETAILED DESCRIPTION OF THE INVENTION

Number 1 in FIG. 1 indicates a device for laterally joining tubular wrappings 2 of products 3.

Each tubular wrapping 2 is formed from a respective sheet 4 of wrapping material wrapped in known manner about respective product 3 as this is fed along a wrapping path defined by a wrapping wheel 5 whereby products 3 and respective wrappings 2 are fed to an unloading station 6.

Known wrapping wheel 5 presents a number of equally-spaced peripheral radial seats 7, which are arrested successively at a loading station (not shown) where a sheet 4 and respective product 3 are inserted inside each seat 7. More specifically, as sheet 4 and product 3 are fed inside seat 7, sheet 4 is folded in a U about product 3 so as to present two projecting longitudinal portions 8 and 9, which are folded, the second on top of the first, by respective first and second folding devices, only the second of which is shown by 10 in FIG. 1. When so overlapped, portions 8 and 9 define an overlapping lateral portion 11 of tubular wrapping 2.

Known folding device 10 in FIG. 1 is mounted directly on to wheel 5, and presents a plate 12 moving between a detached position and an engaged operating position wherein it rests on and presses respective portion 9 on to portion 8. It should be noted that, in the engaged operating position, plate 12 covers only part of respective portion 9, the terminal portion of which remains substantially exposed.

In addition to folding portion 9 on to portion 8, plate 12 also provides for maintaining pressure on overlapping portions 8 and 9 until wrapped product 3 reaches station 6 where, following detachment of plate 12, product 3 is extracted from seat 7.

A detailed description of the stages whereby sheet 4 is folded about product 3 on wheel 5 is given in co-pending U.S. patent application Ser. No. 07/900,598 filed concurrently by the present Applicant and to which full reference is made herein in the interest of full disclosure.

As shown in FIG. 1, unloading station 6 comprises a known pusher 13 and a counterpusher 14, both mounted in a fixed position in relation to wheel 5, and having respective heads 15, 16 moving back and forth along axis 17 extending radially in relation to wheel 5 and through seat 7 when arrested in station 6.

More specifically, head 15 of pusher 13 moves along axis 17 through a radial opening 18 formed through bottom wall 19 of seat 7 in station 6.

Outwards of wheel 5, head 16 of counterpusher 14 is connected integral with one end of a rod 20 coaxial with axis 17, and is substantially in the form of a rectangular parallelepipedon having its longitudinal axis parallel to the rotation axis (not shown) of wheel 5 and perpendicular to the FIG. 1 plane. On the side facing wheel 5, head 16 is defined laterally by a flat surface 21 perpendicular to axis 17 and designed to contact overlapping portion 11 close to the free edge of portion 9, when rod 20 is moved axially along axis 17 by a linear actuator (not shown), and through an opening 22 in a guide plate 23 perpendicular to axis 17.

Head 16 of counterpusher 14 houses a heat source comprising a shielded resistor 24 housed in removable manner inside a longitudinal seat 25 through head 16, for heating head 16, and more specifically surface 21, to a given temperature.

Resistor 24 forms part of an electric circuit 26 defining a device for joining portions 8 and 9, and which comprises a pair of rails 27 made of electrically conductive material, mounted on rod 20, and mating in sliding manner with respective brushes 28 supported on plate 23 close to rails 27, electrically insulated from plate 23, and connectable to an electric power source. Rails 27 are housed in axial grooves 29 formed on rod 20, and are electrically insulated from rod 20 via the interposition of channels 30 of insulating material.

In actual use, pusher 13 and counterpusher 14 cooperate for unloading wrapped products 3 from respective seats 7, pusher 13 by successively pushing products 3 out of seats 7, and counterpusher 14 by controlling withdrawal of products 3 from seats 7. As products 3 are unloaded, surface 21 of counterpusher 14 comes into contact with and transmits a given amount of heat to overlapping portion 11 of portions 8 and 9.

If sheet 4 consists of other than heat-sealable material, e.g. paper, and portions 8 and 9 are joined via the interposition of a layer (not shown) of adhesive material, said given amount of heat is such as to fully dry said adhesive material and so form a stable connection of portions 8 and 9 before wrapped product 3 is detached from pusher 13 and counterpusher 14.

Conversely, if sheet 4 consists of heat-sealable material, counterpusher 14 acts as a sealing device, which, on contacting overlapping lateral portion 11, provides for heat-sealing and so forming a stable connection of portions 8 and 9.

We claim:

1. A method of laterally joining product wrappings, wherein each said product wrapping is a tubular product wrapping (2) defined by a sheet (4) of wrapping material wrapped about a respective product (3) as said product is fed forward within a retaining element (7) of a wrapping conveyor (5), and wherein each said tubular product wrapping (2) comprises an overlapping lateral portion (11) defined by two opposite longitudinal portions (8, 9) of said sheet (4) of wrapping material being arranged one on top of the other, said method comprising the step of effecting a stable connection between said two portions (8, 9) of said sheet (4) of wrapping material along said overlapping lateral portion (11) as said tubular product wrapping (2) and said respective product (3) are unloaded from within said retaining element (7) of said wrapping conveyor (5) by a pusher (13) and an opposing counterpusher (14), said counterpusher (14) being heated to effect said stable connection.

2. The method as claimed in claim 1, wherein said step of effecting a stable connection comprises transmitting heat to said two portions (8, 9) of said sheet (4) of wrapping material along said overlapping lateral portion (11) as said tubular product wrapping (2) and said respective product (3) are unloaded from within said retaining element (7) of said wrapping conveyor (5).

3. The method as claimed in claim 2, wherein said step of effecting a stable connection further comprises transmitting heat to said two portions (8, 9) of said sheet (4) of wrapping material along said overlapping lateral portion (11) by said heated counterpusher (14) while unloading said tubular product wrapping (2) and said respective product (3) from within said retaining element (7) of said wrapping conveyor (5).

4. A device (1) for laterally joining product wrappings, wherein each said product wrapping is a tubular product wrapping (2) defined by a sheet (4) of wrapping material wrapped about a respective product (3) as said product is fed forward within a retaining element (7) of a wrapping conveyor (5), and wherein each said tubular product wrapping (2) comprises an overlapping lateral portion (11) defined by two opposite longitudinal portions (8, 9) of said sheet (4) of wrapping material being arranged one on top of the other, said device comprising means (13, 14) for successively unloading said tubular product wrapping (2) and said respective product (3) from within said retaining element (7) of said wrapping conveyor (5), said unloading means (13, 14) comprising a pusher (13) and an opposing counterpusher (14), said counterpusher (14) being heated and cooperating with said two portions (8, 9) of said sheet (4) of wrapping material along said overlapping lateral portion (11) for effecting a stable connection between said two portions (8, 9) of said sheet (4) of wrapping material along said overlapping lateral portion (11) as said tubular product wrapping (2) and said respective product (3) are unloaded from within said retaining element (7) of said wrapping conveyor (5).

5. The device as claimed in claim 4, wherein said counterpusher (14) comprises a heat source (24) for transmitting heat to said two portions (8, 9) of said sheet (4) of wrapping material along said overlapping lateral portion (11) as said tubular product wrapping (2) and said respective product (3) are unloaded from within said retaining element (7) of said wrapping conveyor (5).

6. The device as claimed in claim 5, wherein said counterpusher (14) comprises a rod (20) and a head (16) integral with said rod (20) and housing said heat source (24), said head (16) being designed to contact said two portions (8, 9) of said sheet (4) of wrapping material along said overlapping lateral portion (11) as said tubular product wrapping (2) and said respective product (3) are unloaded from within said retaining element (7) of said wrapping conveyor 5).

7. The device as claimed in claim 6, wherein said heat source (24) is operated electrically, and wherein said counterpusher (14) also comprises conducting means (27) extending along said rod (20) and connected electrically and in a sliding manner with fixed contact means (28) for connecting said conducting means (27) to an electric power source.

* * * * *